United States Patent
Luo

(10) Patent No.: US 9,864,131 B2
(45) Date of Patent: Jan. 9, 2018

(54) TUNABLE SUPERSTRUCTURE FIBER GRATING DEVICE

(71) Applicant: Fei Luo, Winchester, MA (US)

(72) Inventor: Fei Luo, Winchester, MA (US)

( * ) Notice: Subject to any disclaimer, the term of this patent is extended or adjusted under 35 U.S.C. 154(b) by 0 days.

(21) Appl. No.: 14/661,473

(22) Filed: Mar. 18, 2015

(65) Prior Publication Data

US 2016/0274298 A1    Sep. 22, 2016

Related U.S. Application Data

(60) Provisional application No. 61/995,075, filed on Apr. 3, 2014.

(51) Int. Cl.
| | | |
|---|---|---|
| *G02B 6/34* | (2006.01) | |
| *G02B 6/00* | (2006.01) | |
| *G02B 6/02* | (2006.01) | |
| *G02B 6/124* | (2006.01) | |

(52) U.S. Cl.
CPC ......... *G02B 6/022* (2013.01); *G02B 6/02071* (2013.01); *G02B 6/02085* (2013.01); *G02B 6/02195* (2013.01); *G02B 6/124* (2013.01); *G02B 6/02095* (2013.01)

(58) Field of Classification Search
CPC ............... G02B 6/022; G02B 6/02057; G02B 6/02071; G02B 6/02095; G02B 6/02085; G02B 6/02195; G02B 6/124; H01S 3/0675; H01S 3/1053; H01S 3/1055
USPC .................................. 385/37, 134–137, 147
See application file for complete search history.

(56) References Cited

U.S. PATENT DOCUMENTS

2009/0110009 A1* 4/2009 Luo .................. G02B 6/022
                                                                        372/6

* cited by examiner

*Primary Examiner* — Akm Enayet Ullah
*Assistant Examiner* — Michael Mooney
(74) *Attorney, Agent, or Firm* — Anderson Gorecki LLP

(57) ABSTRACT

Application of non-uniform strain to discrete segments of a fiber grating mechanically changes the structure type of the associated device, e.g., the refractive index perturbation profile of the fiber grating is changed from uniform to phase shifted superstructured, or from chirped to superstructured. The strain may be applied with one or more deformable corrugated slides which are bonded to the fiber grating between the discrete segments. The applied strain changes the local period of fiber grating. Complex changes may be achieved via variations of corrugated slide dimensions. An LPFG may be provided with bare fiber by applying periodically longitudinal axial strain to fiber at multiple discrete segments on the fiber.

24 Claims, 7 Drawing Sheets

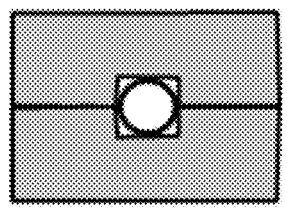
FIG.2a
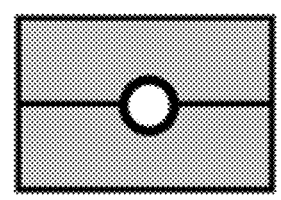
FIG.2b
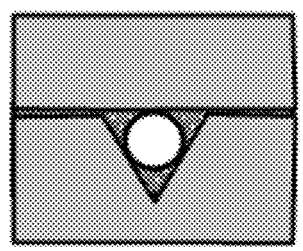
FIG.2c
FIG.2
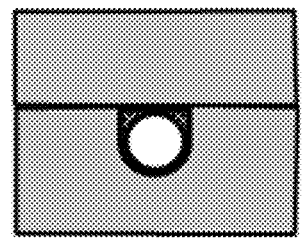
FIG.2d

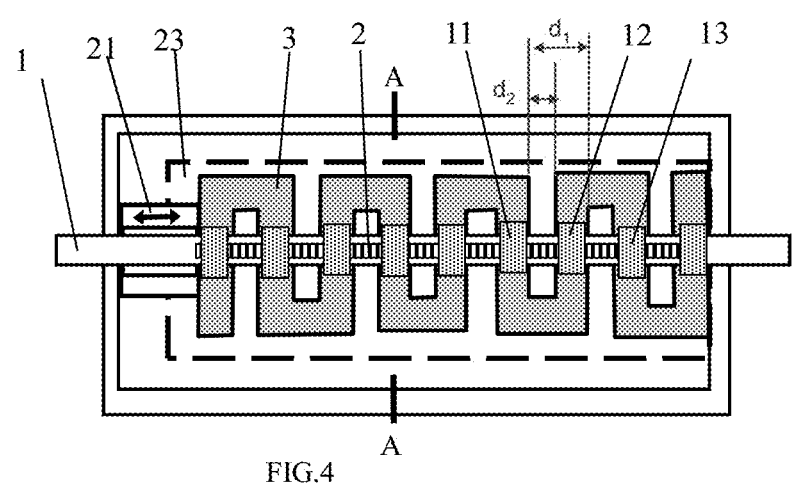
FIG.4
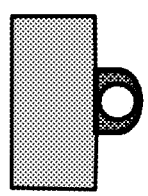  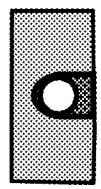
FIG.5a   FIG.5   FIG.5b

TUNABLE SUPERSTRUCTURE FIBER GRATING DEVICE

CROSS-REFERENCE TO RELATED APPLICATIONS

A claim of priority is made to U.S. Provisional Patent Application Ser. No. 61/995,075, entitled TUNABLE SUPERSTRUCTURED FIBER GRATING DEVICE AND OPTICAL SYSTEMS EMPLOYING SAME, filed Apr. 3, 2014, which is incorporated by reference.

BACKGROUND OF THE INVENTION

Aspects of this disclosure are generally related to optical fiber devices, and more particularly to tuning optical fiber gratings. Optical fiber gratings have many applications and are widely used in fiber optic communication systems, fiber optic sensors and fiber lasers to selectively control the wavelength of light propagating in an optical fiber. A typical fiber grating includes a length of optical fiber in which a section of the fiber core has been modified to include a plurality of periodic perturbations in effective refractive index along the length of the fiber.

Fiber Bragg Gratings (FBGs) and Long Period Fiber Gratings (LPFGs) are types of fiber gratings which are distinguished by differences in the periodic spacing of the effective refractive index perturbation along the length of the fiber grating. FBGs reflect particular wavelengths of light in the fiber and transmit all others. The wavelength $\lambda_B$ reflected by FBG can be characterized by $\lambda_B = 2n\Lambda_B$, known as the Bragg condition, or Bragg resonance wavelength, where $\lambda_B$ is the center wavelength of reflected light from the fiber grating, n is the effective refractive index of the fiber core, and $\Lambda_B$ is the period of refractive index perturbation in the fiber. FBGs generally have a narrow wavelength band spectral response and may be used as a narrow band filter or reflective mirror in an optical fiber system. LPFGs have a physical configuration similar to that of FBGs, but the grating period $\Lambda_L$ of typical LPFGs is much longer than the grating period $\Lambda_B$ of typical FBGs. More particularly, $\Lambda_L$ may be from 200 to 2000 times longer than $\Lambda_B$. An LPFG operates by coupling the fundamental mode in the fiber core to the cladding modes of the fiber. The excited cladding modes are then attenuated, resulting in the appearance of resonance loss in the transmission spectrum. Consequently, in contrast to FBGs, LPFGs do not produce reflected light. Phase matching between the fundamental mode and cladding modes at wavelength $\lambda_{mL}$ can be expressed as: $\lambda_{mL} = (n_{core} - n_{cl}^m) \Lambda_L$; where, $n_{core}$ is the effective refractive index of the fundamental mode and $n_{cl}^m$ is the effective refractive index of the $m^{th}$ cladding mode, and $\Lambda_L$ is the period of the LPFG. Since several cladding modes can satisfy this condition, each one is at different center wavelength $\lambda_{mL}$. Consequently, the transmission spectrum of the LPFG exhibits a series of transmission loss peaks along the spectrum distribution.

The structure of the modified fiber section of fiber gratings is associated with variations of amplitude or period of effective refractive index perturbation along the length of fiber. The optical properties (or spectral response) of a fiber grating are a function of the profile of refractive index perturbation along the length of the fiber grating section. The grating period in the fiber grating section can be uniform or graded, and either localized or distributed in a superstructure along the length of the fiber. Examples of various different structures and their spectral responses are described in: Turan Erdogan, "Fiber Grating Spectra," in *Journal of Lightwave Technology*, Vol. 15, No. 8, 1277-1294, August 1997; X. Liu, "Design of superstructure fiber Bragg gratings with a Fourier analysis technique and its applications to multiple ultra narrow transmission gratings," in *Optical Engineering*, Vol. 47, No. 11, 115001-7, November 2008; Maxim A. Bolshtyansky, "Grating-based dispersion compensation devices" in U.S. Pat. No. 6,710,916 (describing the chirped superstructure fiber gratings for application in optical amplifiers and optical network); Ben Eggleton et al., "Broadband grating" in U.S. Pat. No. 6,081,640 (describing several fiber grating structures and application); and Hojoon Lee et al., "Purely Phase-Sampled Fiber Bragg Gratings for Broad-Band Dispersion and Dispersion Slope Compensation," in *IEEE Photonics Technology Letters*, Vol. 15, No. 8, 1091-1093, August 2003.

In general, known types of FBG structures according to refractive index perturbation profiles include uniform FBGs, apodized FBGs, chirped FBGs, phase shifted FBGs, tilted FBGs, superstructure FBGs and LPFGs. Uniform FBGs may be characterized by uniformly distributed refractive index perturbations along the length of the fiber. The spectral response of uniform FBGs includes narrow band reflection and notch transmission. In order to improve side-lobe suppression and maintain reflectivity and bandwidth, the apodization of uniform FBG is normally adopted, in which the amplitude of refractive index perturbation profile of the FBG is ramped up and down along the grating. Typical applications of uniform or apodized FBGs include use as an optical filter in communication systems and as a feedback reflector in a fiber laser system. Chirped FBGs may be characterized by a refractive index perturbation profile having a monotonically varying grating period or linear variation of the grating period along the fiber, e.g., a grating period which increases between each perturbation in series. Chirped FBGs provide broadband spectral reflection in their spectral response. Typical applications include use as dispersion compensation devices in optical communication systems. Phase shifted FBGs may be characterized by changed period spacing at certain point in the refractive index perturbation profile relative to uniform FBGs. A phase shift jump is introduced at the insertion point of the refractive index profile. Phase shifted FBGs introduce a very narrow transmission band within their reflection bandwidth. The phase jump opens up a bandgap within the reflection bandwidth, creating a narrow transmission band. Typical applications include use in DFB (distributed feedback) fiber lasers to generate stable single frequency laser operation. In principle, multiple phase shifts can be introduced into a FBG at one or more locations along the FBG, which can generate multiple narrow transmission bands within the reflection bandwidth of the FBG. Tilted FBGs may be characterized by refractive index perturbation along the length of the fiber being set at an angle relative to the optical axis. Tilted FBGs can couple core mode to cladding mode and radiation mode. The transmission spectrum of tilted FBGs exhibits many resonance peaks. Superstructure FBGs may be characterized by a varying refractive-index perturbation profile distributed in a superstructure along the length of the fiber grating. Superstructure FBGs may have a relatively complex refractive-index perturbation profile which can vary via amplitude, period or both along the length of fiber, e.g., exhibiting multiple nested patterns of perturbations. One example of a superstructure FBG is the so-called "Sampled FBG," which is generated by a periodic amplitude or phase modulation in the refractive index perturbation profile of the FBG along the length of the fiber grating. The resultant spectral response shows multiple narrow reflection channels. The separation and bandwidth of the spectral channels are a function of the sampled period of the refractive index perturbation profile modulation. Furthermore, a full complex superstructure FBG may include a complex refractive-index profile modulation and multiple phase shifts along the fiber grating. Phase shifted FBGs and chirped FBGs may be viewed as examples of superstructure FBGs.

A LPFG may be characterized by a grating period $\Lambda_L$ which is much longer than an FBG grating period $\Lambda_B$. In contrast to FBGs, LPFGs exhibit a spectral response having a series of transmission loss peaks along the transmission spectrum distribution, and do not produce reflection light in the fiber. Typical applications include band-rejection filters and fiber sensors. Similar to FBGs, LPFGs can have a phase shifted structure or a superstructure grating type.

The spectral response of a fiber grating can be affected by strain or temperature applied to the fiber grating. For example, the center wavelength (or resonance wavelength), $\lambda_B=2n\Lambda_B$, can be changed by changing the effective refractive index n of the fiber core or the period $\Lambda_B$ of the fiber grating by applying strain or a temperature delta to the grating. For a given strain $\epsilon_z$, the center wavelength shift of the FBG is $\Delta\lambda_B=\lambda_B (1-p)\epsilon_z$, where p is an effective strain-optic constant. For a given temperature change $\Delta T$, the center wavelength shift is $\Delta \lambda_B=\lambda_B (\alpha_A+\alpha_B) \Delta T$, where $\alpha_A$ is the thermal expansion coefficient of the fiber and $\alpha_B$ represents the thermo-optic coefficient. For a typical FBG with center wavelength at 1550 nm, the strain induced wavelength shift is about 1.2 pm/µε, and the temperature change induced wavelength shift is around 12.8 pm/° C. This effects are the working principle of the FBG based fiber sensors. These physical characteristics can be also used to tune the center wavelength of a FBG, i.e., by applying controlled strain or heat to the FBG to obtain desired center wavelength.

A variety of specific techniques for tuning the spectral response of FBGs with strain and temperature delta are known. One technique, described by Morey, et al. in U.S. Pat. No. 5,469,520, entitled "Compression Tuned Fiber Grating," is to put FBGs inside sliding ferrules and place the ferrules in a mechanical structure to guide and confine the fiber. Another technique, described by Fernald et al. in U.S. Pat. Nos. 6,229,827 and 6,363,089 entitled "Compression-Tuned Bragg Grating and Laser," fuses the FBG in a glass capillary tube. Another technique, described by Long in U.S. Pat. No. 6,360,042, entitled "Tunable optical fiber gratings device," is to bond the FBG on a cantilever beam. The beam can then be bent in different directions, resulting in application of compressive or tensile strain to the FBG. In U.S. Pat. No. 7,801,403, F. Luo et al. describe a fiber grating tuning device which uses corrugated deformable slides to apply strain to tune a fiber grating. All of these techniques are designed for tuning center wavelength shift of a FBG. The tuning strain is applied to the entire fiber grating structure, which introduces a complete spectrum shift. Further, the techniques are limited to tuning the FBG from one structure to another structure in order to obtain a different spectral response, e.g., tuning a uniform FBG into a phase shifted FBG or a superstructure FBG.

A variety of other tuning techniques are known, including the techniques described below.

Feng et al. in U.S. Pat. No. 6,453,095, entitled "Tuning of optical dispersion by using a tunable fiber bragg grating," describe a technique for tuning chirped and sampled non-linearly-chirped fiber gratings by using a piezoelectric element to stretch the FBG.

Moo-Youn Park in U.S. Pat. No. 6,246,814, entitled "Tunable chirped fiber grating device and method for forming chirped fiber grating" describe a tunable chirped grating device in which a piezoelectric element is bonded to a FBG for changing of the perturbation spacing. Piezoelectric elements typically require a high voltage drive and have limited driven displacement, thereby limiting tuning capability.

Michel J. F. Digonnet et al. in U.S. Pat. No. 6,282,341, entitled "Tunable, mechanically induced long-period fiber grating with enhanced polarizing characteristics," describe a mechanical stress induced LPFG in which the LPFG is generated by applying lateral stress on an optical fiber along the length of the fiber periodically.

Yize Huang, "Tunable superstructure fiber Bragg grating with chirp-distribution modulation based on the effect of external stress," *Optics Letters*, Vol. 37, No. 18, 3918-3920, 2012, describes a superstructured FBG with multichannel reflection peaks formed by using a piezoelectric actuator to apply lateral stress along an FBG periodically. Applying lateral stress to an optical fiber will introduce birefringence in the fiber which causes additional polarization problems.

Ximin Zhao in U.S. Pat. No. 6,721,478, entitled "Dynamic fiber bragg grating," describes a technique in which a FBG is generated by using heating elements arranged relative to an optical fiber to form periodic "hot spots" along the length of fiber. Theoretically, the generated fiber grating can be tuned thermally. However, optical fibers have a small temperature coefficient and generating periodic high temperature spots along a fiber in the scale of the FBG period $\Lambda_B$ (typically, $\Lambda_B \sim 0.53$ um at 1550 nm wavelength band) would be difficult or impractical.

SUMMARY OF THE INVENTION

All of the features mentioned herein may be combined in any technically possible manner.

In accordance with an aspect, an apparatus comprises: first and second deformable slides, each deformable slide having at least one corrugated section; an optical fiber having a fiber grating, the fiber grating disposed between the first and second deformable slides, at least one segment of the fiber grating having at least one fixed connection to the first deformable slide and at least one fixed connection to the second deformable slide; and an actuator configured to apply force to the first and second deformable slides, thereby inducing axial compressive or tensile strain to the fiber grating via the fixed connections, the induced strain presented to at least one section of the fiber grating at one or more locations adjacent to the fixed connections, whereby a refractive index perturbation profile of the fiber grating is changed in response to the actuator. In some implementations the refractive index perturbation profile of the fiber grating is changed from uniform or apodized to phase shifted or superstructure. In some implementations the refractive index perturbation profile of the fiber grating section is changed from chirped to superstructure. The refractive index perturbation profile of the fiber gratings could be changed from one structure to other structure, and the spectral response of the fiber grating is changed thereby. The corrugated section of the deformable slides may be comprise ridges and valleys having complex periods.

In accordance with an aspect an apparatus comprises: one deformable slide including at least one corrugated section, an optical fiber having a fiber grating, at least one segment of the fiber grating having at least one fixed connection to the deformable slide; and an actuator configured to apply force to the deformable slide, thereby inducing axial compressive or tensile strain to the fiber grating via the at least one fixed connection, the induced strain presented to at least one section of the fiber grating at one or more locations adjacent to the at least one fixed connection, whereby a refractive index perturbation profile of the fiber grating is changed in response to the actuator. In some implementations the refractive index perturbation profile of the fiber grating is changed from uniform or apodized to phase shifted or superstructure. In some implementations the refractive index perturbation profile of the fiber grating is changed from chirped to superstructure. The refractive index perturbation profile of the fiber gratings could be changed from one structure to other structure, and the spectral response of the fiber grating is changed thereby.

In accordance with an aspect a method for forming a superstructure fiber grating comprises: first and second deformable slides having one or more corrugated section; an optical fiber having a fiber grating section, the fiber grating is sandwiched between deformable slides, the fiber grating section having a plurality of discrete segment fixed connections to the faced ridges of the two deformable slides; and an actuator configured to apply force to the deformable slides, thereby inducing pure longitudinal axial compressive or tensile strain to the fiber grating via the fixed connections, the induced strain presented to the fiber grating at one or more locations adjacent to the fixed connections, whereby a refractive index perturbation profile of the fiber grating is changed in response to the actuator. In some implementations the refractive index perturbation profile of the fiber grating is changed from uniform or apodized to phase shifted or superstructure. In some implementations the refractive index perturbation profile of the fiber grating section is changed from chirped to superstructure. The refractive index perturbation profile of the fiber gratings could be changed from one structure to other structure, and the spectral response of the fiber grating is changed thereby. The corrugated section of deformable slides may be comprise ridges and valleys having complex periods.

In accordance with an aspect a method for forming a superstructure fiber grating comprises: one deformable slide having one or more corrugated section; an optical fiber having a fiber grating section, the fiber grating section having a plurality of discrete segment fixed connections to the deformable slide; and an actuator configured to apply force to the deformable slide, thereby inducing longitudinal axial compressive or tensile strain to the fiber grating via the fixed connections, the induced strain presented to the fiber grating at one or more locations adjacent to the fixed connections, whereby a refractive index perturbation profile of the fiber grating is changed in response to the actuator. In some implementations the refractive index perturbation profile of the fiber grating is changed from uniform or apodized to phase shifted or superstructure. In some implementations the refractive index perturbation profile of the fiber grating section is changed from chirped to superstructure. The refractive index perturbation profile of the fiber gratings could be changed from one structure to other structure, and the spectral response of the fiber grating is changed thereby. The corrugated section of deformable slide may be comprise ridges and valleys having complex periods.

In accordance with an aspect an apparatus comprises: first and second deformable slides, each deformable slide having at least one corrugated section; an optical fiber disposed between the first and second deformable slides, the fiber having at least three discrete fixed connections to the first deformable slide and at least three discrete fixed connections to the second deformable slide; and an actuator configured to apply force to the first and second deformable slides, thereby inducing axial compressive or tensile strain to the fiber via the fixed connections, the induced strain presented to the fiber at two or more locations adjacent to the fixed connections, whereby a long period fiber grating is provided in response to the actuator.

In accordance with an aspect an apparatus comprises: at least one deformable slide having at least one corrugated section; an optical fiber having at least three discrete fixed connections to the at least one deformable slide; and an actuator configured to apply force to the first and second deformable slides, thereby inducing axial compressive or tensile strain to the fiber via the fixed connections, the induced strain presented to the fiber at two or more locations adjacent to the fixed connections, whereby a long period fiber grating is provided in response to the actuator.

BRIEF DESCRIPTION OF THE FIGURES

FIGS. 2a, 2b, 2c and 2d are section views taken along line A-A of FIG. 1 for different groove shape implementations for fixing portions of the fiber grating relative to the corrugated deformable slides.

FIG. 4 is a side view of a fiber grating tuning device wherein multiple segments of the fiber grating are separately fixed to a corrugated deformable slide.

FIGS. 5a and 5b are section views taken along line A-A of FIG. 4, showing fiber grating bonding on the side of the corrugated deformable slide and the inside of the corrugated deformable slide, respectively.

DETAILED DESCRIPTION

Figure 1:
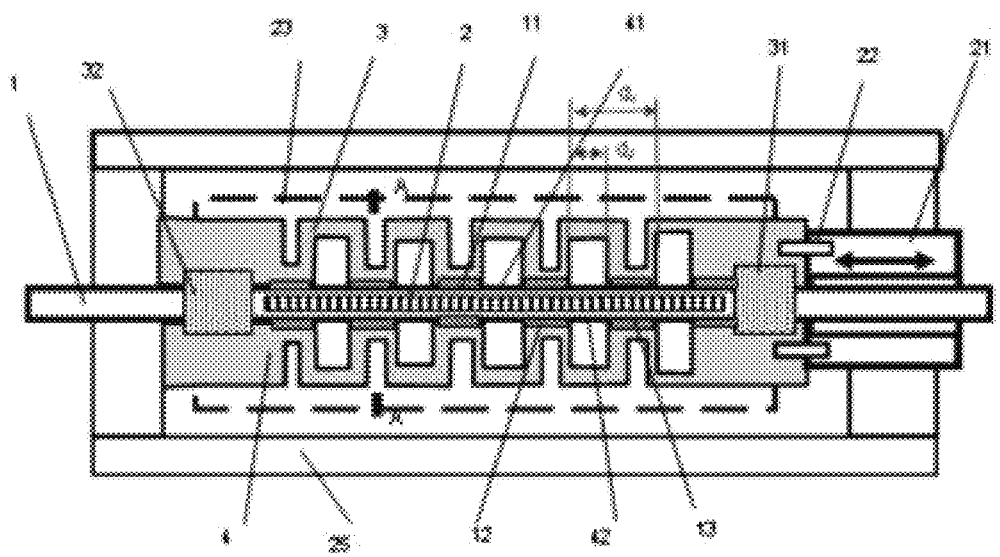
FIG. 1 is a side view of a fiber grating tuning device wherein multiple segments of the fiber grating section are separately fixed relative to corrugated deformable slides.

Referring to FIGS. 1 and 2, in one implementation a fiber grating tuning device includes an optical fiber 1 with a fiber grating 2 in the fiber core, and two corrugated deformable slides 3, 4. The deformable slides 3, 4 are mated along contact faces with the fiber grating 2 disposed between the slides. More particularly, the grating section 2 is placed in a groove formed in the contact faces, e.g. as shown in FIGS. 2a-2d, and the fiber grating 2 is sandwiched between the two deformable slides 3, 4. The grooves can have a wide variety of shapes including but not limited to "V" shape (see FIG.

2c), "U" shape (see FIG. 2d), rectangular shape (see FIG. 2a), semi-circular shape (see FIG. 2b), etc. The grooves are not necessarily symmetrical or identical on the mated slides 3, 4. For example, FIGS. 2c and 2d show implementations in which the groove is formed in one slide only. Multiple discrete segments 11, 12, 13 of the fiber grating are separately bonded to ridges of the deformable corrugated slides. Moreover, the corrugated deformable slides may be manufactured using 3D printing technology, in this implementation, both deformable slides 3.4 may be printed as one part and the fiber grating can be embedded during the 3D printing process. An actuator 21 is used to apply force to the slides 3, 4. The actuator 21 may include a micrometer, piezo actuator, stepper motor or servo motor driven actuator, or thermal actuator, for example and without limitation. The force applied via the actuator deforms the slides by changing increasing or decreasing the length of valleys located between the ridges along the length of the fiber. The length of the ridges remains relatively constant. Deformation of the slides induces strain on the fiber via the bonded segments to axially compress or stretch the fiber grating.

The strain applied to the fiber grating is non-uniform. Interval sections 41, 42 of the fiber grating adjacent to valleys, which are between bonded segments of fiber grating adjacent to ridges, are subjected to localized variations of strain. As the slides 3, 4 deform in response to applied force, the length of the interval sections 41, 42 along the fiber changes, whereas the length of the bonded segments 11, 12, 13 along the fiber remains relatively constant. Consequently, the grating period $\Lambda_B$ or $\Lambda_L$ in the interval sections 41, 42 of the fiber grating is locally changed as a function of applied axial strain. Movement of the actuator 21 to the left in the illustrated example compresses the deformable slides 3, 4, which results in application of compressive strain on interval sections 41, 42 (not all intervals referenced) but not on bonded segments. Movement of the actuator 21 to the right in the illustrated example stretches the deformable slides 3, 4, which results in application of tensile strain on interval sections 41, 42 but not on bonded segments. The period of the perturbations located in the interval sections changes as a function of the applied strain. Consequently, a uniform FBG which has a uniform distributed refractive index perturbation profile can be tuned to become a superstructure FBG in which the refractive index perturbation profile along the length of the fiber is complex, e.g., periodically modulated with period $d_1$. Moreover, the spectral response of the FBG can be tuned via applied strain by the actuator.

Figure 3:
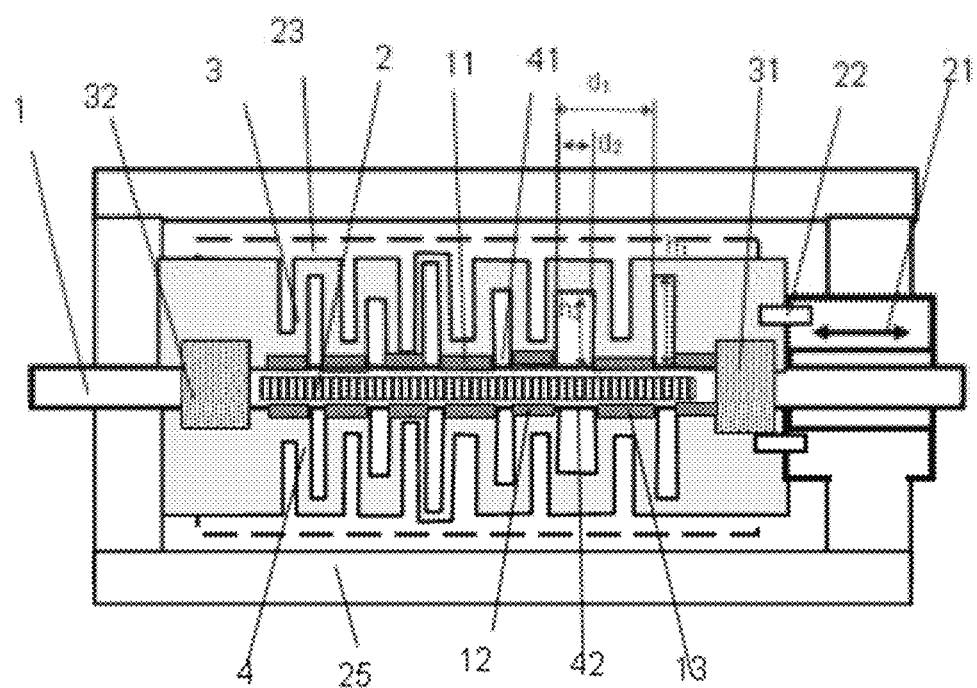
FIG. 3 is a side view of a fiber grating tuning device wherein corrugated deformable slides have complex corrugating periodicity to realize a complex modulated refractive index profile in a superstructure fiber grating.

Referring to FIG. 3 and FIG. 4, characteristics of superstructure FBG formed from uniform grating, the strain modulated refractive index perturbation profile of the superstructure FBG may be at least in part as a function of the lengths, heights, periodicities and patterns of ridges and valleys of the deformable corrugated slides. The corrugated deformable slides 3, 4 may have, for example, a uniform corrugating period length $d_2$ and opening gap length $d_1$, as shown in FIG. 1. The corrugated deformable slides 3, 4 may have, for example, a chirped corrugating period, or any other of a wide variety of complex corrugating periods. Some or all corrugated sections on deformable slides could have different dimensions of lengths $d_1$, $d_2$ and heights $h_1$, $h_2$, as shown in FIG. 3. Moreover, the ridges which are bonded to segments of the fiber grating could be evenly or unevenly distributed. Consequently, the resulting superstructure FBG may have a complex modulated refractive-index profile.

While deformable slides is driven by actuator, the different local strain could be introduced into different interval sections of the fiber grating due to the deformable slides have non uniform opening gaps $d_2$ and heights $h_2$ at each corrugated section.

The deformable slides 3, 4 assembled with fiber grating 2 in FIG. 1 and FIG. 3 could be also placed on a thermal electric plate 23 for thermal tuning, since the deformable slides and the optical fiber are different materials, they have different thermal expansion coefficients, the temperature change will cause thermal strain applied to the fiber grating. The corrugated structure of the deformable slides introduce corrugated strain along the fiber grating.

Figure 6:
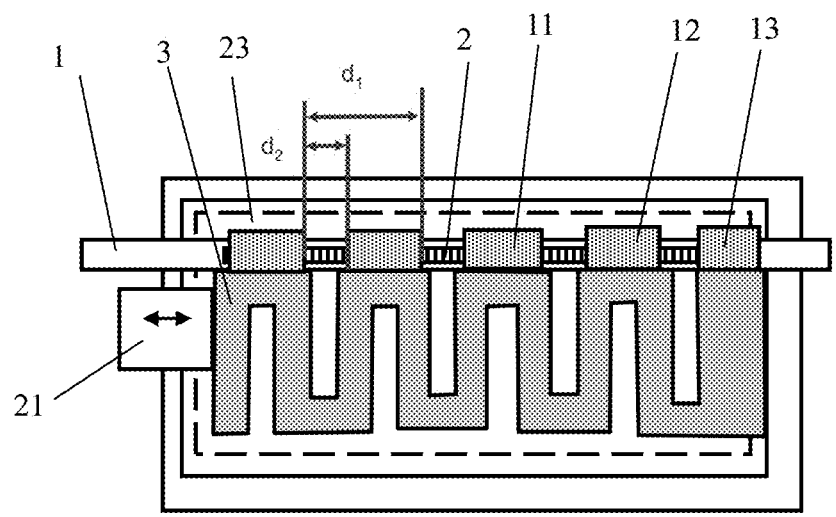
FIG. 6 is a side view of a fiber grating tuning device wherein one corrugated deformable slide is employed and multiple segments of the fiber grating are separately fixed on the top of the corrugated deformable slide.

FIG. 4, FIG. 5 and FIG. 6 illustrate implementations in which a single corrugated deformable slide is employed. Multiple discrete segments of the fiber grating 2 may be bonded on or in the single corrugated deformable slide as specifically shown in FIG. 4 and FIG. 5a, 5b. Discrete segments of the fiber grating 2 could be also fixed on an outer edge of the corrugated deformable slide as specifically shown in FIG. 5a and FIG. 6. While the deformable slide is compressed or stretched by the actuator 21, the interval sections 41, 42 between bonded segments of the fiber grating are subjected to localized strain (compressive strain or tensile strain), so that the grating period $\Lambda_B$ or $\Lambda_L$ in the interval section of the fiber grating is modulated according to introduced axial strain while the bonded segments are not modulated. As in other implementations, characteristics of superstructure FBGs formed from uniform gratings, the strain modulated refractive index perturbation profile of the superstructure FBG may be at least in part a function of the lengths, heights, periodicities and patterns of ridges and valleys of the single deformable corrugated slide. The slide may have a uniform period of corrugating ($d_2$ and opening gap $d_1$ distributed uniformly to be equal), a chirped period of corrugating, or any other of a wide variety of complex corrugating periods in which some or all ridges and valleys could have different size of $d_1$, and $d_2$. Consequently, a complex superstructure FBG can be constructed, and the refractive-index profile of the FBG can be modulated along the length of the fiber grating. The tuning principle is substantially similar to that described with regard to the implementation of FIG. 1.

Figure 7:
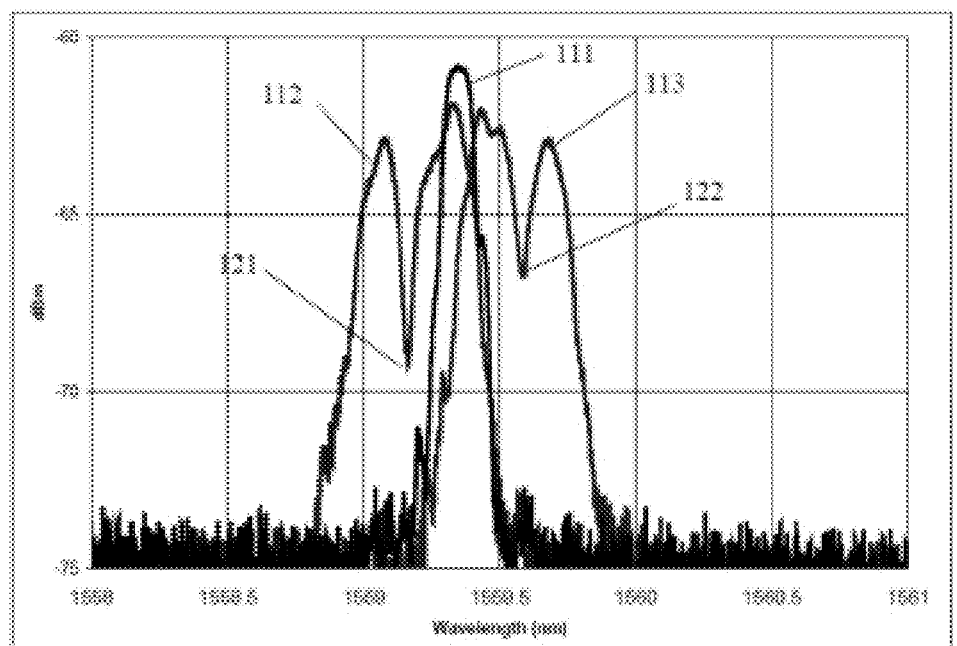
FIG. 7 shows results of a uniform FBG tuned to become a phase shifted FBG, where the phase shift of the FBG is tuned according to compressive or tensile strain on the FBG applied by deformable slides.

FIG. 7 shows spectrum profile curves of a uniform FBG tuned to become a phase shifted FBG, where the phase shift of the FBG is tuned according to compressive or tensile strain on the FBG applied by deformable slides such as described above. Original spectrum curve 111 from uniform FBG is tuned to become a phase shifted FBG having spectrum curve 112 and spectrum curve 113. Spectrum curve 112 corresponds to compressive tuning Spectrum curve 113 corresponds to stretching tuning. Spectrum dips 121 and 122 on spectrum curve 112 and spectrum curve 113 correspond to introduced equivalent phase shift in the FBG. These results show that a uniform FBG can be tuned to be a phase shifted FBG, and the spectral response can be tuned according to applied local axial strain on the FBG.

Figure 8:
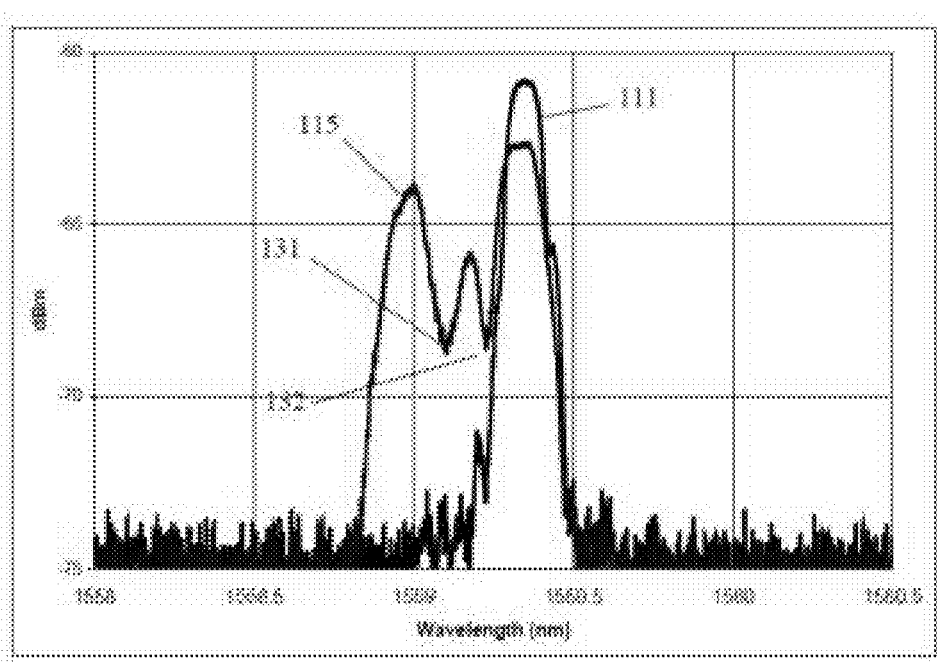
FIG. 8 shows results of a uniform FBG tuned to become a phase shifted FBG, where two phase shifts are introduced at different locations in the FBG.

FIG. 8 shows spectrum profile curves of a uniform FBG tuned to become a phase shifted FBG. Original spectrum curve 111 from uniform FBG is tuned to become phase shifted FBG spectrum curve 115 in which two phase shifts are introduced in the FBG at different places. Spectral dips 131 and 132 on the spectrum curve 115 represent the phase shifts in the tuned FBG.

Figure 9:
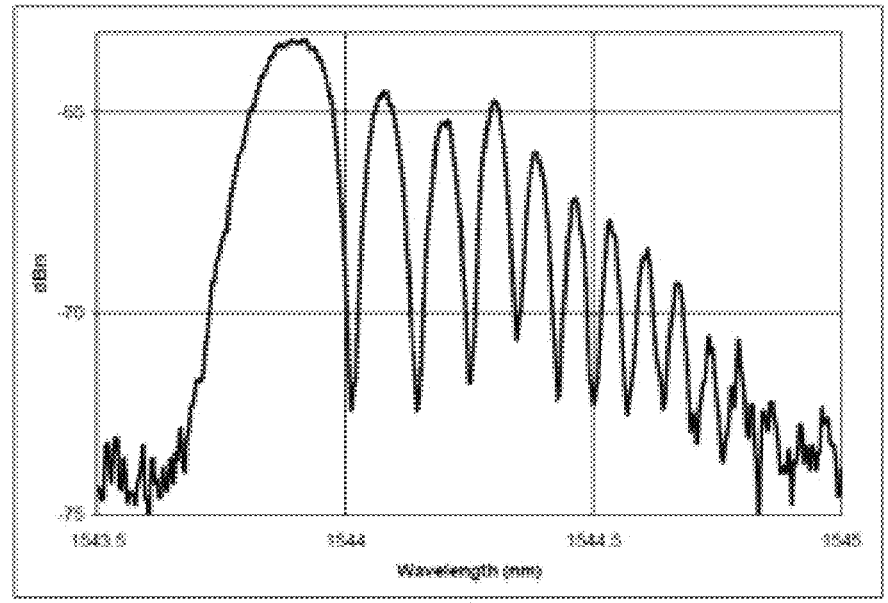
FIG. 9 shows results of a uniform FBG tuned to become a superstructure FBG, in which the modulated refractive index profile of the FBG has complex structure along the length of the FBG.

FIG. 9 shows a spectrum profile curve of a uniform FBG tuned to become a superstructure FBG. The modulated refractive index profile of the FBG has complex structure along the length of the FBG. Multiple spectral channels are obtained in the spectral response.

Concepts described above may be used for applying strain to an optical fiber to generating a LPFG in the fiber. A section of bare optical fiber (no fiber grating) can be employed to instead of the fiber grating section. Multiple fiber sections may be periodically bonded to the corrugated deformable slides. With selective dimensional characteristics a mechanically induced LPFG can be constructed in the fiber in this manner. The period of the LPFG is equal to the corrugating period length $d_1$ of the deformable slide. Axial deformation (compression or stretching) of the deformable slide is driven by an actuator, and localized longitudinal axial strain is applied to the each interval section $d_2$ on the fiber. Consequently, the refractive index change is applied to each interval section distributed along the length of the fiber, and this refractive index change is modulated according to the applied axial strain. The mechanically induced LPFG can be tuned accordingly. This may help to mitigate birefringence in the fiber and avoid polarization dependence problems due to the pure axial strains are applied.

Figure 10:
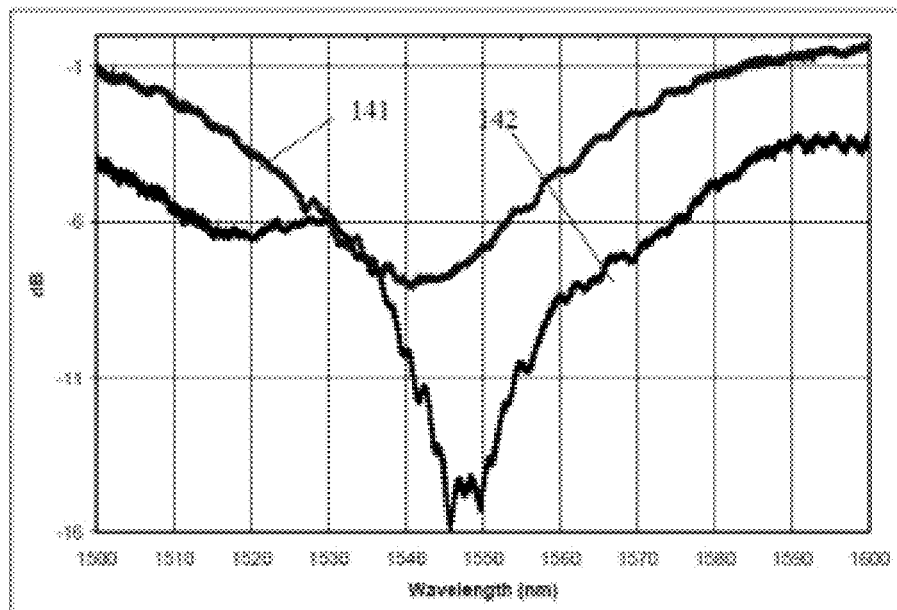
FIG. 10 shows results of a bare fiber tuned to become a LPFG.

FIG. 10 shows results of a bare fiber tuned to become a LPFG. The mechanically tuned LPFG resulting from application of longitudinal axial strain can be tuned by applying different strain resulting in spectrum curves 141 and 142.

In all of the implementations described herein the fiber gratings can be any type of a wide variety of fiber gratings or fiber grating combinations. The fiber gratings can be fiber Bragg grating (FBG) or long period fiber grating (LPFG). The fiber gratings can have various grating structures in response to applied stress, including but not limited to uniform, apodized, phase shifted, chirped, tilted, sampled and superstructure. The refractive index perturbation profile of fiber gratings could be tuned from one structure to other structure, and the spectral response of the fiber grating is changed thereby. The fiber gratings can be written in single mode fiber, PM fiber, multi-mode fiber, double clad fiber, rare earth doped fiber or photonic crystal fiber. Furthermore, several fiber gratings could be bonded in parallel in one device assembly, e.g., such that they can be tuned together simultaneously.

While illustrative aspects, implementations and features have been shown and described, a wide variety of variations, modifications and combinations are possible. These variations, modifications and combinations will be apparent to those skilled in the art and are deemed to be within the spirit and scope of the invention.

What is claimed is:

1. An apparatus comprising:
   first and second deformable slides, each deformable slide having at least one corrugated section;
   an optical fiber having a fiber grating, the fiber grating disposed between the first and second deformable slides, at least one segment of the fiber grating having at least one fixed connection to the first deformable slide and at least one fixed connection to the second deformable slide; and
   an actuator configured to apply force to the first and second deformable slides, thereby inducing axial compressive or tensile strain to the fiber grating via the fixed connections, the induced strain presented to at least one section of the fiber grating at one or more locations adjacent to the fixed connections, whereby a refractive index perturbation profile of the fiber grating is changed in response to the actuator.

2. The apparatus of claim 1 wherein the refractive index perturbation profile of the fiber grating is changed from uniform to one of phase shifted, sampled and superstructure.

3. The apparatus of claim 1 wherein the refractive index perturbation profile of the fiber grating is changed from apodized to one of phase shifted, sampled and superstructure.

4. The apparatus of claim 1 wherein the refractive index perturbation profile of the fiber grating section is changed from chirped to one of phase shifted, sampled and superstructure.

5. An apparatus comprising:
   one deformable slide including at least one corrugated section,
   an optical fiber having a fiber grating, at least one segment of the fiber grating having at least one fixed connection to the deformable slide; and
   an actuator configured to apply force to the deformable slide, thereby inducing axial compressive or tensile strain to the fiber grating via the at least one fixed connection, the induced strain presented to at least one section of the fiber grating at one or more locations adjacent to the at least one fixed connection, whereby a refractive index perturbation profile of the fiber grating is changed in response to the actuator.

6. The apparatus of claim 5 wherein the refractive index perturbation profile of the fiber grating is changed from uniform to one of phase shifted, sampled and superstructure.

7. The apparatus of claim 5 wherein the refractive index perturbation profile of the fiber grating is changed from apodized to one of phase shifted, sampled and superstructure.

8. The apparatus of claim 5 wherein the refractive index perturbation profile of the fiber grating is changed from chirped to one of phase shifted, sampled and superstructure.

9. A method for forming a superstructure fiber grating comprising:
   first and second deformable slides having one or more corrugated section;
   an optical fiber having a fiber grating section,
   the fiber grating is sandwiched between deformable slides, the fiber grating section having a plurality of discrete segment fixed connections to the faced ridges of the two deformable slides; and
   an actuator configured to apply force to the deformable slides, thereby inducing pure longitudinal axial compressive or tensile strain to the fiber grating via the fixed connections, the induced strain presented to the fiber grating at one or more locations adjacent to the fixed connections, whereby a refractive index perturbation profile of the fiber grating is changed in response to the actuator.

10. The method of claim 9 wherein the refractive index perturbation profile of the fiber grating is changed from uniform to one of phase shifted, sampled and superstructure.

11. The method of claim 9 wherein the refractive index perturbation profile of the fiber grating section is changed from apodized to one of phase shifted, sampled and superstructure.

12. The method of claim 9 wherein the refractive index perturbation profile of the fiber grating section is changed from chirped to one of phase shifted, sampled and superstructure.

13. The method of claim 9 wherein the corrugated section comprises ridges and valleys having complex periods.

14. A method for forming a superstructure fiber grating comprising:
   one deformable slide having one or more corrugated section;
   an optical fiber having a fiber grating section, the fiber grating section having a plurality of discrete segment fixed connections to the deformable slide; and an actuator configured to apply force to the deformable slide, thereby inducing longitudinal axial compressive or tensile strain to the fiber grating via the fixed connections, the induced strain presented to the fiber grating at one or more locations adjacent to the fixed connections, whereby a refractive index perturbation profile of the fiber grating is changed in response to the actuator.

15. The method of claim 14 wherein the refractive index perturbation profile of the fiber grating is changed from uniform to one of phase shifted, sampled and superstructure.

16. The method of claim 14 wherein the refractive index perturbation profile of the fiber grating section is changed from apodized to one of phase shifted, sampled and superstructure.

17. The method of claim 14 wherein the refractive index perturbation profile of the fiber grating section is changed from chirped to one of phase shifted, sampled and superstructure.

18. The method of claim 14 wherein the corrugated section comprises ridges and valleys having complex periods.

19. An apparatus comprising:
first and second deformable slides, each deformable slide having at least one corrugated section;
an optical fiber disposed between the first and second deformable slides, the fiber having at least three discrete fixed connections to the first deformable slide and at least three discrete fixed connections to the second deformable slide; and
an actuator configured to apply force to the first and second deformable slides, thereby inducing axial compressive or tensile strain to the fiber via the fixed connections, the induced strain presented to the fiber at two or more locations adjacent to the fixed connections, whereby a long period fiber grating is provided in response to the actuator.

20. An apparatus comprising:
at least one deformable slide having at least one corrugated section;
an optical fiber having at least three discrete fixed connections to the at least one deformable slide; and
an actuator configured to apply force to the first and second deformable slides, thereby inducing axial compressive or tensile strain to the fiber via the fixed connections, the induced strain presented to the fiber at two or more locations adjacent to the fixed connections, whereby a long period fiber grating is provided in response to the actuator.

21. The apparatus of claim 1 wherein the refractive index perturbation profile of the fiber grating is changed in response to the actuator from long period to one of phase shifted, sampled and superstructure.

22. The method of claim 9 wherein the refractive index perturbation profile of the fiber grating is changed in response to the actuator from long period to at least one of shifted, sampled and superstructure.

23. The method of claim 9 wherein the refractive index perturbation profile of the fiber grating to be changed is one of uniform, apodized, chirped, tilted, long period, phase shifted, sampled and superstructure.

24. The method of claim 14 wherein the refractive index perturbation profile of the fiber grating section to be changed is one of uniform, apodized, chirped, tilted, long period, phase shifted, sampled and superstructure.

* * * * *